L. D. VAN VALKENBURG.

RETAINER FOR FOUNTAIN PENS AND PENCILS.

APPLICATION FILED JAN. 3, 1913.

Reissued July 15, 1913. 13,596.

WITNESSES:

H. L. Sprague

R. M. Mowry

INVENTOR,

Levi D. Van Valkenburg

BY Wm. S. Reeve

ATTORNEY.

UNITED STATES PATENT OFFICE.

LEVI D. VAN VALKENBURG, OF HOLYOKE, MASSACHUSETTS.

RETAINER FOR FOUNTAIN-PENS AND PENCILS.

13,596. Specification of Reissued Letters Patent. Reissued July 15, 1913.

Original No. 948,802, dated February 8, 1910, Serial No. 498,125. Application for reissue filed January 3, 1913. Serial No. 740,086.

*To all whom it may concern:*

Be it known that I, LEVI D. VAN VALKENBURG, a citizen of the United States of America, and resident of Holyoke, in the county of Hampden and State of Massachusetts, have invented certain new and useful Improvements in Retainers for Fountain-Pens and Pencils, of which the following is a full, clear, and exact description.

This invention relates to improvements in retaining devices or clips to be employed on fountain pens or pencils for the purpose of acquiring clamping engagement of the edge portion of a vest pocket between a member of the retainer and the side of the fountain pen or pencil, whereby liability of loss of the pen or pencil is avoided.

The invention comprises in a device of the character described a metallic band to constrictively encircle a fountain pen or pencil having a forwardly extended spring tongue of peculiar form and a metallic bar-like plate having a fulcrum engagement with the spring-tongue and being provided respectively with a rearwardly extended operating lever member and a forwardly extended clamping member. And an object accomplished by the provision of a device constructed in accordance with this invention is to provide a very simple, cheap and efficient retainer without the necessity of employing pivots or spiral springs.

The improved device is illustrated in the accompanying drawings, in which:—

Figure 1:
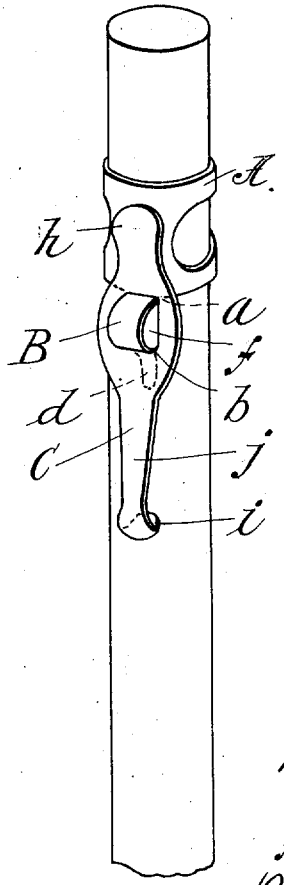
Figure 2:
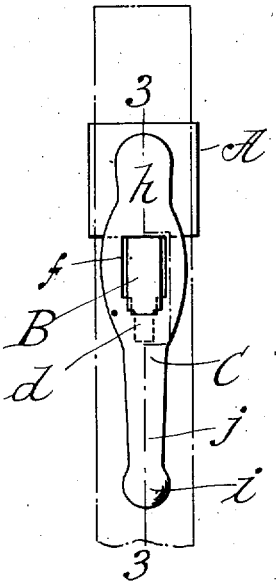
Figure 3:
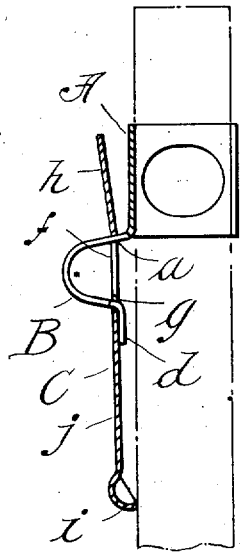
Figure 4:
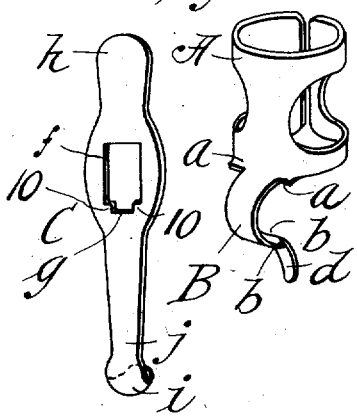
Figure 5:
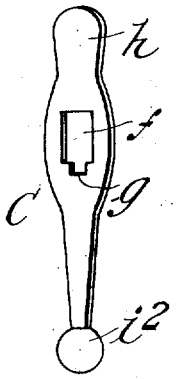

Figure 1 is a perspective view showing the retaining device as operatively employed on a pen or pencil. Fig. 2 is a front view of the same. Fig. 3 is a sectional view on line 3—3, Fig. 2. Fig. 4 is a perspective view showing the tongue provided encircling band and the bar-like plate in separated relations, which two parts together constitute the improved device in its entirety; Fig. 5 is a perspective view showing a slight modification in the form of a bar-like plate.

Similar characters of reference indicate corresponding parts in all of the views.

In the drawings,—A represents the metallic band of thin spring metal to constrictively encircle a pencil or the cap of a fountain pen,—such clip having a forwardly extending spring tongue B of outwardly bowed loop form, the appliance being provided with oppositely located shoulders *a a*, as most clearly shown in Fig. 4, adjacent the junction with the band of the rear portion of the loop tongue, and the said loop tongue has oppositely located shoulders *b b* at its forward portion with the narrowed tongue extension *d* forwardly projecting beyond the latter named shoulders *b b*. C represents a metallic bar-like plate having in an intermediate portion thereof a substantially rectangular aperture *f* to accommodate therethrough the said loop-tongue and also having a recess *g* narrower than the aperture *f* and in continuation of the forward portion of said aperture. The bow of the loop tongue B normally, that is before the engagement therewith of the lever-like plate C, is slightly longer than the length of the aperture *f* so that when the parts are assembled and the loop tongue is crowded through the aperture, such loop-tongue is placed under tension or spring reaction. And it will be, furthermore, perceived that when the parts are assembled the said narrow tongue extension *d* of the loop tongue is passed transversely through the recess *g* and is extended forwardly under and in engagement with the portion of the bar plate next forwardly of the recess, while the forward shoulders *b b* have engagements on the top of the bar plate at the opposite portions 10, 10, thereof, seen in Fig. 4, at the opposite margins of the recess *g*; and the portions of the bar plate marginally and laterally of the rear end of its aperture *f* rest on the aforementioned, rearwardly located pair of shoulders *a a* which serve as fulcrum bearings for the bar plate. The operative effect of the combined parts is such that the loop shaped spring tongue exerts a pressure bearing in a downward direction,—that is toward the side of the pen or pencil,—against the clamping member, at a place forward of the fulcrum for the said bar-like plate.

The bar plate comprises a rearwardly extending operating lever member *h* and a forwardly extending clamping member *j*, the extremity of which is turned transversely inwardly toward the side of the pen or pencil, as indicated at *i i*, or it may be provided with a ball end $i^2$ as shown in Fig. 5.

The loop tongue operates by the shoulder engagement at *b b* on the plate bar to hold the clamping member *j* with a spring pressure against the pencil or against a leaf of the pocket intervening between such member and the pencil; and, manifestly, when pressure is applied on the operating lever-like member *h* the bar, which is practically rigid, is swung on its fulcrum at the shoulders *a a* so that the clamping member *j* is moved to open position and against the spring reaction of the loop-tongue.

I claim:—

1. A retainer consisting of a gripping bar member and an instrument clasping member formed with a fulcrum and a spring tongue extending therefrom connecting said gripping bar member to said clasping member, said tongue being bodily fitted in an opening in the body of the gripping bar member and the spring bearing against the gripping bar member, the fulcrum portion of said clasping member spacing one end of the gripping bar therefrom.

2. A retainer consisting of an instrument gripping member having an opening and an instrument clasping member having a fulcrum extending through said opening and a spring bearing against said gripping member below the fulcrum, said fulcrum spacing said gripping member from the instrument clasping member and said spring holding said gripping member against said fulcrum.

3. A retainer consisting of an instrument clasping member and a gripping bar member, and a spring carried by the clasping member and bodily-extended through an opening in the gripping bar member and having an end portion bearing against the gripping bar member, said clasping member having means for spacing one end of said gripping member from the clasping member.

4. A device of the character described consisting of a metallic band, to encircle a fountain pen or pencil, having a forwardly extended spring tongue of outwardly bowed loop form, a metallic bar-like plate having, by an intermediate portion provided with an opening receiving said bowed loop, a fulcrum engagement with a rear portion of said loop tongue, and comprising respectively a rearwardly extended operating lever member, and a forwardly extending clamping member to which latter the loop tongue exerts a transversely forcing pressure.

5. A device of the character described, consisting of a metallic band, to encircle a fountain pen or pencil, having a forwardly extended spring tongue of outwardly bowed loop form, a metallic bar-like plate having, by an intermediate portion provided with an opening receiving said bowed loop, a fulcrum engagement with a rear portion of said loop tongue, and comprising respectively a rearwardly extended operating lever member, and a forwardly extending clamping member against which latter the loop tongue exerts a force in a direction toward the pencil,—the extremity of the loop tongue and the clamping member forward of the fulcrum having a connecting engagement.

6. A device of the character described consisting of a metallic band to encircle a fountain pen or pencil, having a forwardly extended spring tongue of outwardly bowed loop form, a metallic bar-like plate having, by an intermediate portion provided with an opening receiving said bowed loop, a fulcrum engagement with the rear portion of said loop-tongue, having by another more forwardly located portion thereof an engagement under the loop-tongue, and comprising respectively a rearwardly extended operating lever member, and a forwardly extended clamping member.

7. A device of the character described consisting of a metallic band to encircle a fountain pen or pencil, having a forwardly extending spring tongue, of outwardly bowed loop form, which is provided with oppositely located shoulders adjacent its junction with the band and having oppositely located shoulders at its forward portion, with a narrowed tongue extension forwardly projecting beyond the latter shoulders, a metallic ball-like plate having in an intermediate portion thereof an aperture to accommodate therethrough said loop-tongue, having a narrowed recess in continuation of the forward portion of said recess, said narrowed tongue extension passing through said recess and extending under a portion of the plate bar forwardly of the recess while the forward shoulders have engagements on the top of the bar at the opposite margins of said recess,—the portions of the plate bar marginally and laterally of the rear end of its aperture resting on the rearwardly located pair of shoulders, said bar comprising respectively a rearwardly extended operating lever member and a forwardly extended clamping member.

LEVI D. VAN VALKENBURG.

Witnesses:
Wm. S. Bellows,
G. R. Driscoll.